United States Patent
Huang et al.

(10) Patent No.: US 7,873,530 B2
(45) Date of Patent: Jan. 18, 2011

(54) METHOD AND SYSTEM FOR SOLVING STOCHASTIC LINEAR PROGRAMS WITH CONDITIONAL VALUE AT RISK CONSTRAINTS

(75) Inventors: Pu Huang, Yorktown Heights, NY (US); Dharmashankar Subramanian, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 12/110,964

(22) Filed: Apr. 28, 2008

(65) Prior Publication Data

US 2009/0271230 A1 Oct. 29, 2009

(51) Int. Cl.
*G06F 17/60* (2006.01)

(52) U.S. Cl. .......................................... 705/7; 705/10

(58) Field of Classification Search ................ 705/1–50; 706/46, 61, 14, 15; 370/2, 238, 210–222
See application file for complete search history.

(56) References Cited

U.S. PATENT DOCUMENTS

2005/0207531 A1* 9/2005 Dempsey et al. .............. 378/65

OTHER PUBLICATIONS

"Optimization of Conditional Value-At-Risk" by R. T. Rockafellar, et al., in the spring, 2000, Journal of Risk, vol. 2, No. 3.

* cited by examiner

*Primary Examiner*—Mary Cheung
*Assistant Examiner*—Marissa Liu
(74) *Attorney, Agent, or Firm*—McGinn IP Law Group, PLLC

(57) ABSTRACT

An apparatus including a calculator to determine an optimal solution to a stochastic linear programming problem or a stochastic mixed-ineteger linear programming problem with conditional value at risk constraints (CVaRs). The optimal solution is determined by generating a sequence of solutions that converge to the optimal solution.

15 Claims, 4 Drawing Sheets

METHOD AND SYSTEM FOR SOLVING STOCHASTIC LINEAR PROGRAMS WITH CONDITIONAL VALUE AT RISK CONSTRAINTS

BACKGROUND OF THE INVENTION

1. Field of the Invention

The present invention generally relates to optimization of financial portfolios. More specifically, a sequence of carefully constructed compact linear programs is constructed, which converges to the optimal solution. The procedure can also be applied to solve stochastic mixed-integer linear programming problems.

2. Description of the Related Art

Many businesses have to make decisions about how to allocate limited resources to a group of "candidates" such that the resulting portfolio ensures a best possible outcome for certain chosen business objectives. For example, in the investment industry, fund mangers need to decide how to allocate and/or re-allocate their funds to various financial instruments to maximize return. In project management, project managers need to decide how to allocate limited budget to projects to optimize certain performance objectives (e.g., revenue, cost, strategic impact, etc.).

The general characteristics of portfolio management problems are at least as follows:

1. Decisions are made under uncertainty. In investment portfolio management, returns of financial instruments are uncertain. In project portfolio management, future revenues of projects are uncertain.
2. Resources of various types are limited. In investment portfolio management, the amount of available funds is limited. In project portfolio management, budget and human resources are limited.
3. Risk attitude towards portfolio performance significantly affects the decision. It is typically true that greater potential returns (or future revenues) are also associated with greater risk. Depending on the decision maker's risk attitude, a risky portfolio with a higher potential return might or might not be acceptable.
4. Portfolio decisions are driven by business objectives. Investment portfolio decisions are usually driven by the desire of maximizing returns. Project portfolio decisions are often driven by multiple criteria, often including revenue, cost, strategy considerations, etc.

One can build stochastic optimization models for portfolio selection problems, and consequently solve the models to find the optimal portfolio that leads to the best outcome. In these models, uncertainty is characterized by random variables, and decision-markers' risk attitudes are incorporated by imposing bounds on risk measures.

The best known method for stochastic programs with CVaR (Conditional Value at Risk) risk measure (discussed in more detail relative to Formulation (1) below) consists of the following steps:

First, generate samples (using Monte Carlo simulation or other methods) for random variables;

Second, use the samples obtained to re-formulate the original problem as a linear program;

Third, solve the linear program to get a solution. For more details of this approach, see the article "Optimization of Conditional Value-at-Risk" by R. T. Rockafellar, et al., in the spring, 2000, *Journal of Risk*, Vol. 2, No. 3.

The second step of reformulation introduces a large number of auxiliary variables and constraints, leading to a linear program that is significantly larger than the original problem. Indeed, the number of auxiliary variables and constraints introduced is proportional to the number of samples obtained in the first step. This causes the method to break down for even modest-size original problems.

More generally, many financial portfolio optimization problems can be formulated as stochastic programs. Such problems typically have several risk constraints. The best known solution leads to a prohibitively large linear program.

Thus, a need exists for improving the efficiency of solving risk-constrained stochastic programs with CVaR risk measures.

SUMMARY OF THE INVENTION

In view of the foregoing, and other, exemplary problems, drawbacks, and disadvantages of the conventional systems, it is an exemplary feature of the present invention to provide a structure (and method) in which an efficient procedure is used to solve general risk-constrained optimization problems with CVaR risk measures.

It is, therefore, an exemplary feature of the present invention to provide a structure and method for iteratively estimating the optimal solution and the conditional value at risk for each constraint by solving a sequence of carefully constructed compact linear programs, or mixed-integer linear programs, that converge to the optimal solution.

In a first exemplary feature of the present invention, to achieve the above features and objects, described herein is an apparatus, including a calculator to determine an optimal solution to a stochastic linear programming problem, or a stochastic mixed-integer linear programming problem, with CVaR constraints, the optimum being determined by generating a sequence of solutions that converge to the optimal solution.

In a second exemplary feature, also described herein is a computerized method that determines this optimal solution.

In a third exemplary feature, also described herein is an apparatus for optimizing portfolios, including a calculator to determine an optimal solution to a portfolio expressed as a stochastic linear programming problem, or stochastic mixed-integer linear programming problem, with conditional value at risk (CVaR) constraints, the optimal solution being determined by generating a sequence of solutions that converge to the optimal solution.

The present invention provides a number of advantages over the conventional methods, including:

1. Computational time is an order of magnitude lower than the best known approach.
2. Particularly attractive for solving stochastic mixed-integer linear programs with conditional value at risk constraints, which are notoriously difficult for the best known approach.
3. A sequence of solutions can be generated that converge to the optimum, thus the user can terminate the sequence at any time to get a rapid approximation, depending on the user's time limit.
4. Memory requirements are significantly lower than the best known approach.

The method of the present invention can be used in any domain that leads to stochastic linear programs, or stochastic mixed-integer linear programs, with conditional value at risk constraints, including product/project portfolio management, financial portfolio management, and resource management.

Thus, the present invention provides a method and tool that can be applied particularly for product/project portfolio management services and tools, financial optimization services and tools, supply chain management services and tools, resource allocation services and tools, etc.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF EXEMPLARY EMBODIMENTS OF THE INVENTION

Figure 1:
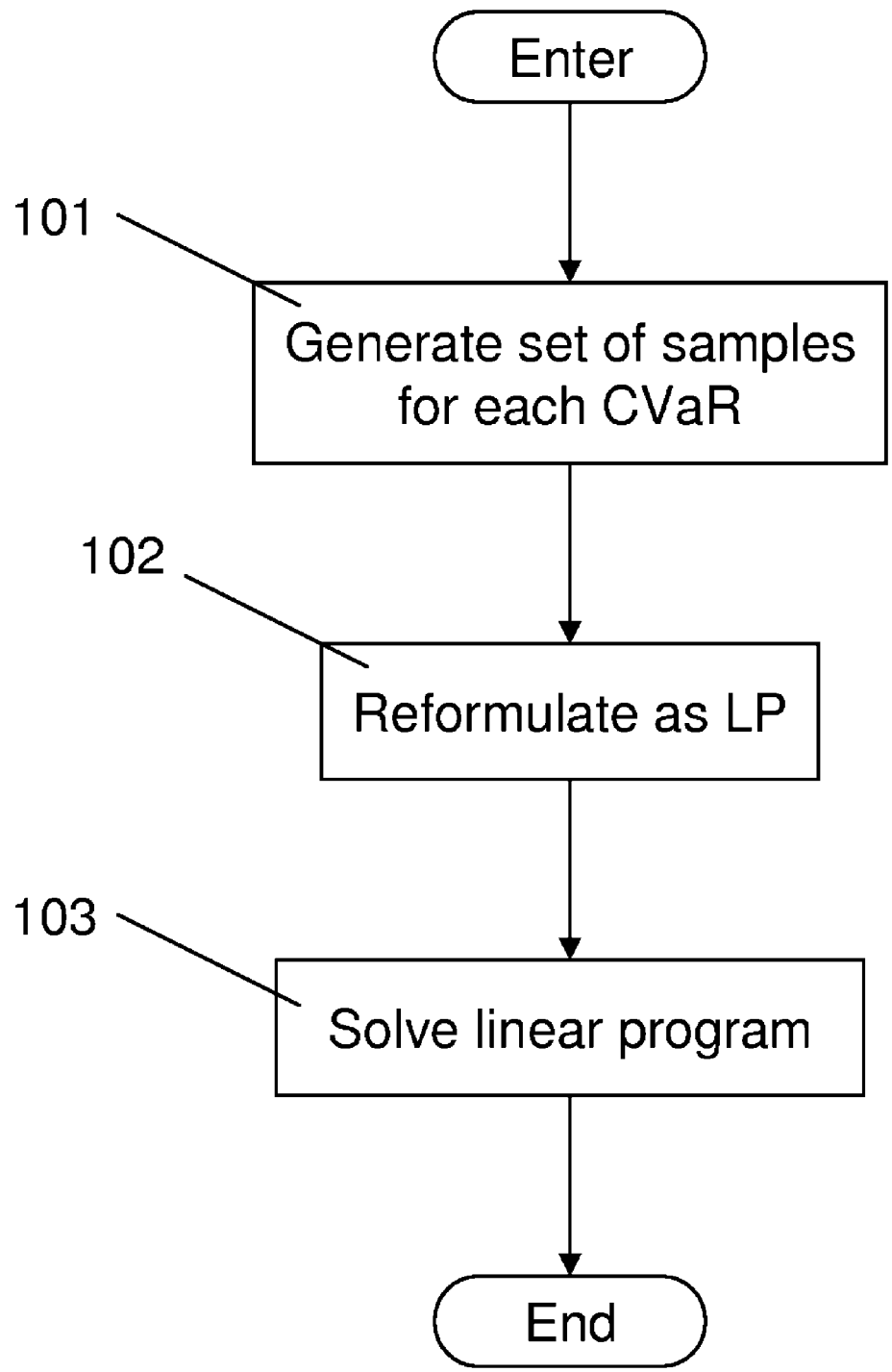
FIG. 1 shows exemplarily a flowchart 100 of a conventional method of finding a CVaR stochastic solution.

Referring now to the drawings, and more particularly to FIGS. 2-5, there are shown preferred embodiments of the method and structures according to the present invention.

A stochastic program with CVaR risk measures can be written in the following canonical form:

$$\max c_1 x_1 + c_2 x_2 + \ldots + c_n x_n$$

$$CVaR_1(a_{11}x_1 + a_{12}x_2 + \ldots + a_{1n}x_n) \leq b_1$$

$$CVaR_2(a_{21}x_1 + a_{22}x_2 + \ldots + a_{2n}x_n) \leq b_2$$

$$\ldots$$

$$CVaR_m(a_{m1}x_1 + a_{m2}x_2 + \ldots + a_{mn}x_n) \leq b_m$$

$$x_i \geq 0, i = 1, 2, \ldots n \quad (1)$$

In this form, $a_{ij}$, $i=1, 2, \ldots, m$, $j=1, 2, \ldots n$, are random variables, representing uncertainty associated with the problem; $c_j$, $j=1, 2, \ldots, n$, and $b_i$, $i=1, 2, \ldots, m$, are deterministic parameters; $CVaR_i(\ )$, $i=1, 2, \ldots, m$, are CVaR risk measures that take a random quantity as input and generate a deterministic output as the measure of risk; $x_j$, $j=1, 2, \ldots n$, are non-negative decision variables to be determined.

The method of the present invention solves the canonical stochastic program as shown in (1) above. Because of the general applicability of the canonical form, this method can be utilized to solve any problems that can be written in such a form, given that all the risk functions are CVaR.

CVaR is a risk measure widely used in finance. It measures the expected value of a random variable given that it is greater than a certain threshold. Typically, this threshold is not specified explicitly, but implicitly by a percentage $0 \leq \beta \leq 1$. The relationship between the threshold and $\beta$ is as follows: the probability of the random variable to be greater than the threshold is $1-\beta$. To specify a CVaR risk measure, one needs to specify the associated parameter $\beta$. In typical financial applications, $\beta$ is chosen to be close to 100%, say 95%, and CVaR measures the expected financial loss, considering only losses that might happen with less than 5% of probability (unlikely large losses). In other applications, CVaR carries similar meaning. In essence, CVaR measures the expected impact of rare events that happen with a small probability $1-\beta$.

Figure 2:
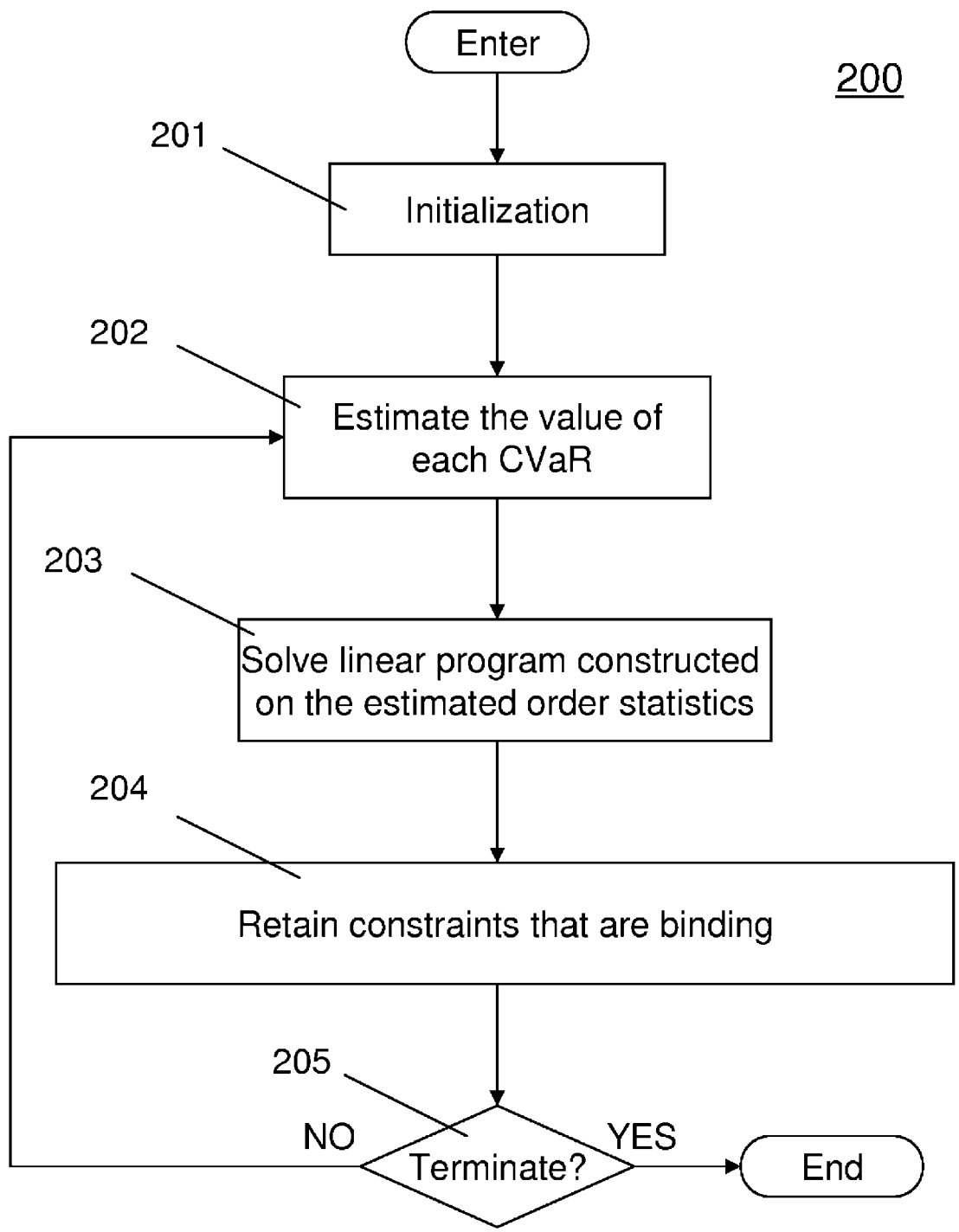
FIG. 2 shows exemplarily a flowchart 200 of the method of the present invention.

FIG. 2 shows exemplarily in simple flowchart format the method of the present invention.

In step 201, a solution x is estimated.

In step 202, the CVaR value in each conditional value at risk constraint is estimated. This is done by using the current x to estimate the order statistics for each constraint.

In step 203, a linear program is constructed, based on the estimated order statistics, and solved.

In step 204, the binding constraints are found by examining the dual and retained, and the process returns to step 202.

In step 205, the processing is terminated after it converges or after a user-selected number of iterations have been executed.

In more detail, the method of the present invention reformulates stochastic program (1) as a series of small linear programs. The solution to a preceding linear program is used to dynamically construct a new, succeeding linear program. Here is the basic procedure:

1. Generate K samples of matrix $[a_{ij}]$, $i=1, 2, \ldots, m$, $j=1, 2, \ldots, n$. Let $[a_{ij}^k]$ denote the k-th sample matrix, and $a_{ij}^k$ denote the element in the i-th row and j-th column of the k-th sample matrix.

2. Assign an initial solution $x_j^0$ to $x_j$, $j=1, 2, \ldots n$. Construct an initial linear program $LP^0$ that maximizes the original objective with constraints $x_j \geq 0$, $j=1, 2, \ldots n$, as follows:

$$\max c_1 x_1 + c_2 x_2 + \ldots + c_n x_n$$

$$(LP^0)$$

$$x_j \geq 0, j=1, 2, \ldots n$$

3. Let $LP^t$ and $x_j^t$ denote the linear program and the corresponding solution we obtained in the preceding t-th iteration. Now we start to construct a new linear program $LP^{t+1}$ based on $LP^t$ and $x_j^t$. To do so, perform the following steps for each constraint in the original problem that involves a CVaR risk measure (indexed by $i=1, 2, \ldots m$):

a. Compute $L_i^k = a_{i1}^k x_1^t + a_{i1}^k x_2^t + \ldots + a_{in}^k x_n^t$ for each sample $k=1, 2, \ldots, K$.

b. Sort $L_i^k$, $k=1, 2, \ldots, K$, in descending order. Let $L_i^s$ denote the s-th largest value of $L_i^k$, $k=1, 2, \ldots, K$, and $a_{i1}^s, a_{i2}^s, \ldots, a_{in}^s$ denote the corresponding coefficients that are used to compute $L_i^s$.

c. Let $\beta_i$ denote the parameter associated with the CVaR function in the i-th original constraint, and $r_i$ denote the largest integer that is less than $K(1-\beta_i)$, add the following constraint to linear program $LP^t$, $$\frac{1}{r_i} \sum_{s=1}^{r_i} \sum_{j=1}^{n} a_{ij}^s x_j \leq b_i. \quad (2)$$

4. After finish step 3, we obtain a new linear program $LP^{t+1}$ by adding new constraints like (2) to $LP^t$. Now solve $LP^{t+1}$ to get a new solution $x_j^{t+1}$.

5. Remove from $LP^{t+1}$ the non-binding constraints except $x_j \geq 0$, $j=1, 2, \ldots n$.

6. Determine whether to terminate the procedure or not. If yes, stop and output $x_j^{t+1}$ as the solution to the original problem. Otherwise, assign $x_j^{t+1}$ to $x_j^t$, and t+1 to t;

Go back to Step 3 and start another iteration.

The basic idea of this invention is as follows: In the each iteration t+1, we plug the solution $x_j^t$ obtained in the preceding iteration into the left-hand side of each constraint in the original problem to compute a CVaR value, we then construct a new constraint using only those samples that have contributed to the computation of the CVaR value (as shown in step 3c), and add this constraint to $LP^{t+1}$, the linear program to solve in iteration t+1. Repeating this procedure leads to the optimal solution to the original problem.

For better understanding, we give an example to illustrate the above procedure. Consider the following simple stochastic program with only one CVaR constraint, max $2x_1+3x_2$ $CVaR(a_1x_1+a_2x_2) \leq 5$ $x_i \geq 0, i=1,2$ Assume the $\beta$ parameter associated with the single CVaR measure is 75%.

Follow the procedure. Step 1, generate 10 samples (K=10) for random variables $a_1$ and $a_2$ as shown below:

| Sample index k | $a_1$ | $a_2$ |
|---|---|---|
| 1 | 3.7982 | 0.8779 |
| 2 | 7.8333 | 0.5437 |
| 3 | 6.8085 | 6.2537 |
| 4 | 4.611 | 0.2573 |
| 5 | 5.6783 | 7.6793 |
| 6 | 7.9421 | 13.6623 |
| 7 | 0.5918 | 1.8568 |
| 8 | 6.0287 | 0.7068 |
| 9 | 0.5027 | 12.2479 |
| 10 | 4.1537 | 12.1708 |

Step 2, assign initial value $[x_1,x_2]=[1, 2]$, and construct $LP^0$ as max $2x_1+3x_2$ $x_j \geq 0, j=1,2$ Step 3a, compute $L_i^k$ for the single CVaR constraint (index i=1).

| Sample index k | $a_1$ | $a_2$ | $L_i^k$ |
|---|---|---|---|
| 1 | 3.7982 | 0.8779 | 5.554 |
| 2 | 7.8333 | 0.5437 | 8.9207 |
| 3 | 6.8085 | 6.2537 | 19.3159 |
| 4 | 4.611 | 0.2573 | 5.1256 |
| 5 | 5.6783 | 7.6793 | 21.0369 |
| 6 | 7.9421 | 13.6623 | 35.2667 |
| 7 | 0.5918 | 1.8568 | 4.3054 |
| 8 | 6.0287 | 0.7068 | 7.4423 |
| 9 | 0.5027 | 12.2479 | 24.9985 |
| 10 | 4.1537 | 12.1708 | 28.4953 |

Step 3b, sort $L_i^k$ in descending order and we get the following table. Note that index s indicates the position of $L_i^k$ in the sorted list, and k is the original index.

| Sample index k | $a_1$ | $a_2$ | $L_i^k$ | Sort index s |
|---|---|---|---|---|
| 6 | 7.9421 | 13.6623 | 35.2667 | 1 |
| 10 | 4.1537 | 12.1708 | 28.4953 | 2 |
| 9 | 0.5027 | 12.2479 | 24.9985 | 3 |
| 5 | 5.6783 | 7.6793 | 21.0369 | 4 |
| 3 | 6.8085 | 6.2537 | 19.3159 | 5 |
| 2 | 7.8333 | 0.5437 | 8.9207 | 6 |
| 8 | 6.0287 | 0.7068 | 7.4423 | 7 |
| 1 | 3.7982 | 0.8779 | 5.554 | 8 |
| 4 | 4.611 | 0.2573 | 5.1256 | 9 |
| 7 | 0.5918 | 1.8568 | 4.3054 | 10 |

Step 3c, compute $r_i$ for the single CVaR constraint (index i=1). Since K=10 and $\beta$=75%, we have K(1-$\beta$)=2.5, and the largest integer that is less than 2.5 is 2, so we get $r_i$=2. Now pick up samples of $a_1$ and $a_2$ from the first two rows (because $r_i$=2) in the sorted table we got in step 3b to construct the following constraint, $$\frac{1}{2}(7.9421 + 4.1537)x_1 + \frac{1}{2}(13.6623 + 12.1708)x_2 \leq 5. \quad (3)$$

Add this constraint to $LP^0$ to get $LP^1$.

Step 4, solve $LP^1$, we get $[x_1,x_2]=[0.826733, 0.0]$.

Step 5, since constraint (3) is binding, we don't remove it from $LP^1$.

Step 6, we decide not to determinate. Go back to step 3 and start a new iteration.

The procedure and the example shown above are meant to illustrate the basic idea of the method of the present invention and are not intended to be limiting in any way.

It is noted that many variances of the above procedure will achieve the same purpose of solving the canonical stochastic program. For example, Step 5 of removing the non-binding constraints can be skipped (or one can remove only a part of the non-binding constraints) and the method will still work (except that there will be more constraints to deal with). As another example, one may sample $a_{ij}$ row-wise if there is no cross-row dependency between these random variables, instead of sampling the whole matrix $[a_{ij}]$ as a whole, as described in the above procedure. As yet another example, one may dynamically generate samples (even potentially different samples) on the fly in each iteration, instead of generating all the samples in Step 1 and then re-use them in all the following iterations.

All these variances follow the same basic idea of the present invention and, thus, are considered to be covered in this method. Any other variances that follow the same basic idea of the present invention are considered to be covered in this method as well.

It is also noted that the present invention can be applied to any stochastic programs that can be transformed to the canonical form. For example, if a parameter $a_{ij}$ is a deterministic number, one can treat it as a random variable with all the samples taking the same value. As another example, if there is a CVaR term in the objective function, one can introduce a variable y to replace that term, and then add new constraints to bound y to transform the problem to the canonical form.

All these stochastic programs are considered to be covered by the present invention as they can be transformed to the canonical form. Any other stochastic programs that can be transformed to the canonical form are considered to be covered by the present invention as well.

The present invention can be applied to solve stochastic mixed-integer linear programs as well. The procedure is the same as the one described above except that in each iteration we construct and solve a compact mixed-integer linear program instead of a linear program.

ADVANTAGES OF THE PRESENT INVENTION

1. Computational time of our method is significantly lower than the best known approach. Experiments on modest-size problem instances with 30 binary variables (n=30), 200 constraints (m=200), 1000 samples (K=1000) reveal that the best known approach could not find an solution in three hours while our method found the optimal solution in about 10 minutes.

2. Our method can generate a sequence of solutions that converge to the optimum, thus the user can terminate the sequence at any time to get a rapid approximation, depending on the user's time limit.

3. Progressively sampling technique can be easily embedded into our method. Progressively sampling increases the size of samples as the solutions converging to the optimum. It is a technique widely used to boost the accuracy of the final solution.

4. Since our method always solves a small linear program in each iteration, the memory requirements are significantly lower than the best known approach.

Exemplary Software Implementation

Figure 3:
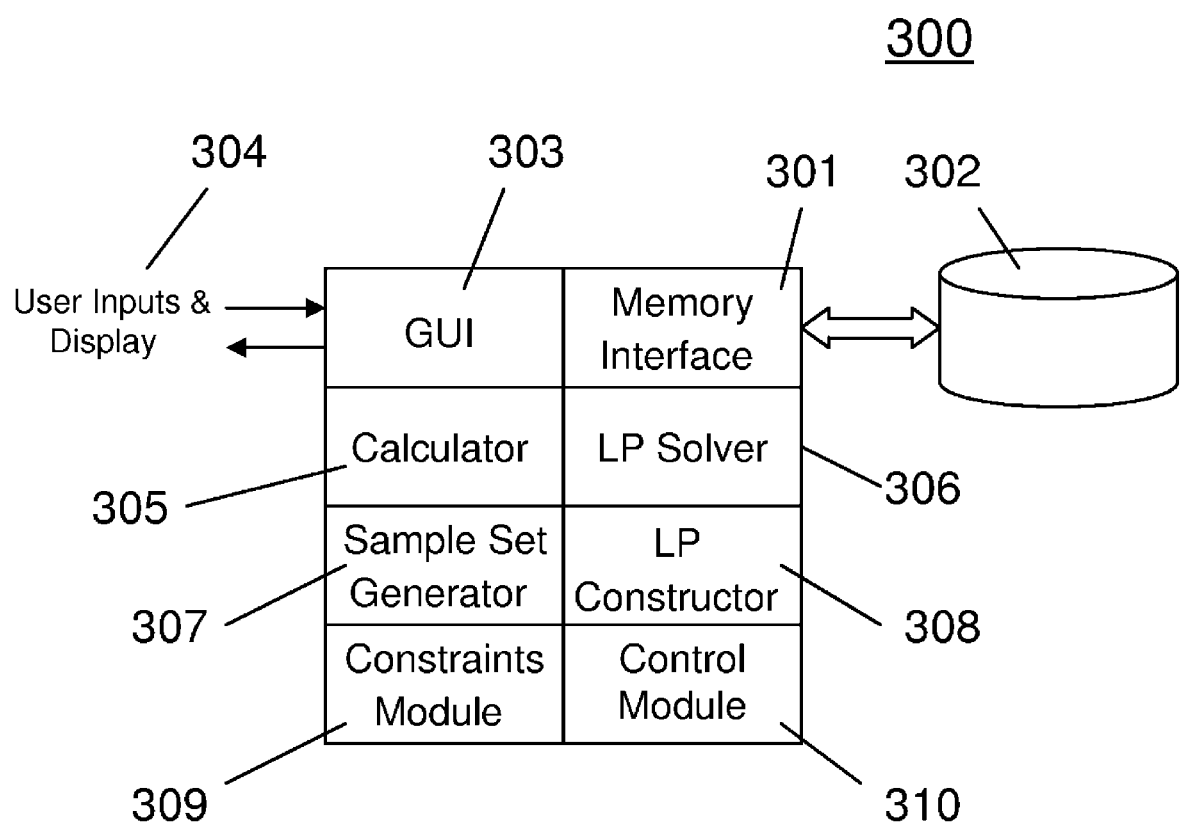
FIG. 3 shows exemplarily a block diagram 300 of a software embodiment of the present invention.

FIG. 3 illustrates exemplarily a block diagram 300 of a software implementation of the concepts of the present invention, whether implemented as a standalone software package or embedded into another application program. Memory module 301 interfaces with computer memory 302, and graphical user interface 203 interfaces with a user 304 to receive inputs and display data. Calculator module 305 executes the mathematical processing described above and might include access to a subroutine or separate software module 306 for the LP solution optimization.

Sample set generator module 307 generates the sets of samples for the CVaR constraints, and LP construct module 308 constructs the linear programs to be input into the LP solver 306. Constraint module 309 executes the steps of examining the dual to find the binding constraints and determining which samples should be retained for the next iteration. Control module 310 serves as a main program for the various modules and would typically invoke these modules as subroutines from this main program.

Exemplary Hardware Implementation

Figure 4:
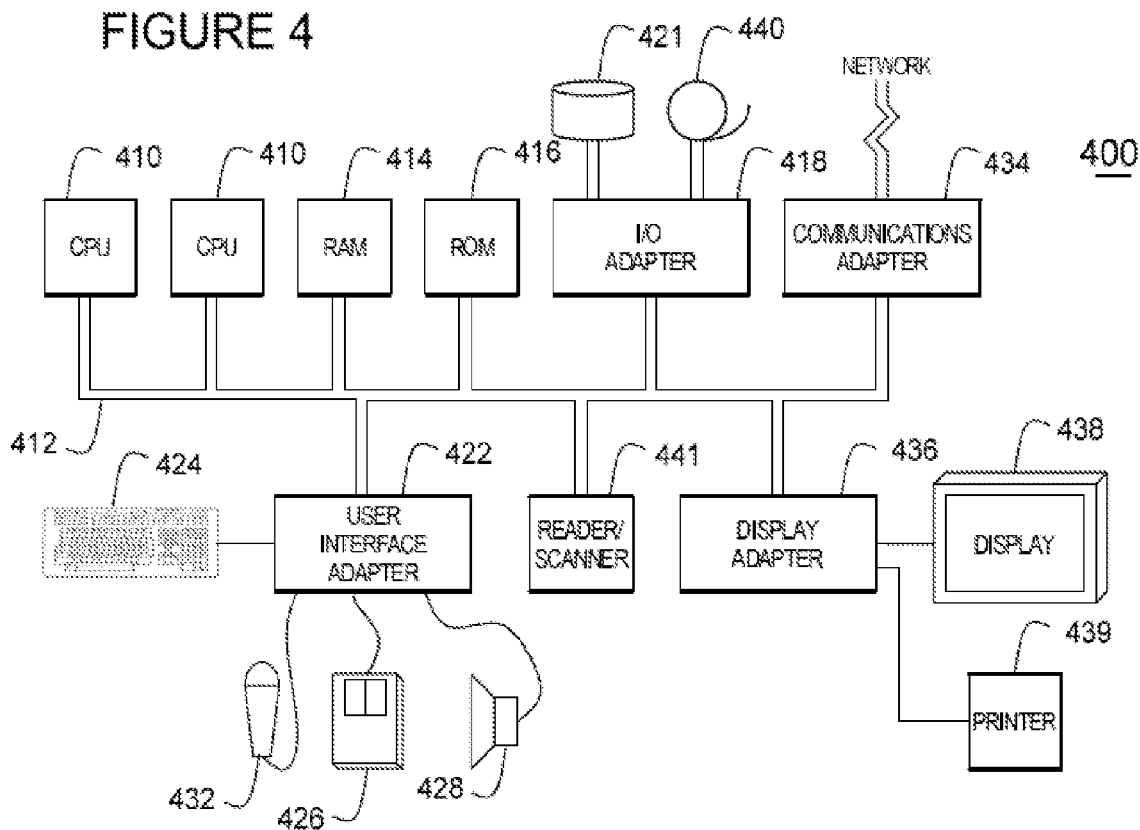
FIG. 4 illustrates an exemplary hardware/information handling system 400 for incorporating the present invention therein.
Figure 5:
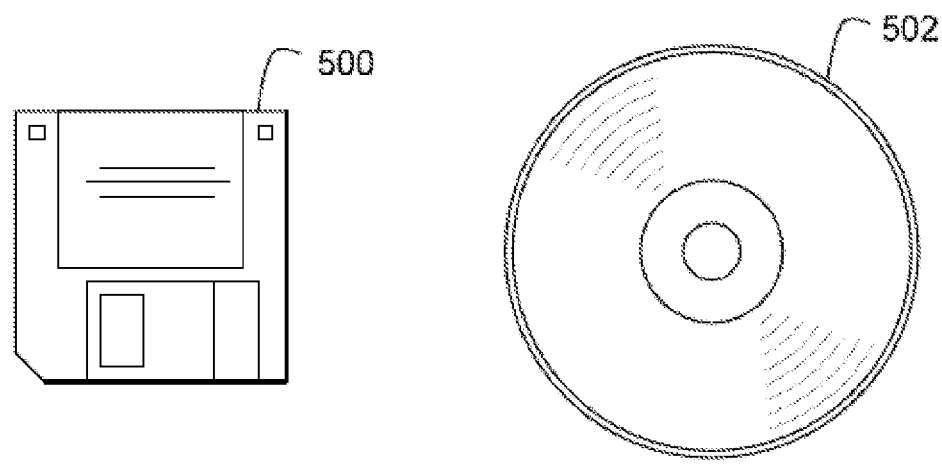
FIG. 5 illustrates a signal bearing medium 500 (e.g., storage medium) for storing steps of a program of a method according to the present invention.

FIG. 4 illustrates a typical hardware configuration of an information handling/computer system in accordance with the invention and which preferably has at least one processor or central processing unit (CPU) 411.

The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting an information handling system to a data processing network, the Internet, an Intranet, a personal area network (PAN), etc., and a display adapter 436 for connecting the bus 412 to a display device 438 and/or printer 439 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 411 and hardware above, to perform the method of the invention.

This signal-bearing media may include, for example, a RAM contained within the CPU 411, as represented by the fast-access storage for example. Alternatively, the instructions may be contained in another signal-bearing media, such as a magnetic data storage diskette 500 (FIG. 5), directly or indirectly accessible by the CPU 411.

Whether contained in the diskette 500, the computer/CPU 411, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media. The present invention is also considered as protected against using transmission media, such as digital and analog and communication links and wireless, to transmit and/or execute the claimed process in an unauthorized manner. In an illustrative embodiment of the invention, the machine-readable instructions may comprise software object code.

From the above discussion, it should be clear that the method of the present invention can be used in any domain that leads to stochastic linear programs with conditional value at risk constraints, including particularly applications in product/project portfolio management, financial portfolio management, resource management. The method can be used in services and software products that perform product/project portfolio management, financial optimization, supply chain management, resource allocation, transportation, etc.

Accordingly, in yet another aspect, the present invention can be used as a basis for a service, such as a consultation or service for assistance in managing these domains, including, for example, product/project management, financial management, and/or resource management. Included in this aspect is the provision of such services by way of the Internet.

While the invention has been described in terms of a single preferred embodiment, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. An apparatus, comprising:
   a calculator programmed to determine an optimal solution to a stochastic linear programming problem, or stochastic mixed-integer linear programming problem, with conditional value at risk (CVaR) constraints, as executed by a processor on said apparatus, said optimal solution being determined by generating a sequence of solutions that converge to said optimal solution; and a constraints module, as executed by said processor, to generate new constraints for a next iteration,
wherein said optimal solution is determined using a sequence of steps as follows:
   a first solution x is provided as an initial estimate of said optimal solution;
   the CVaR value in each CVaR constraint is estimated by using a current solution x to estimate order statistics for each constraint;
   a linear program, or a mixed-integer linear program (if the problem is a stochastic mixed integer linear program) is constructed based on the estimated order statistics;
   said linear program or a mixed-integer linear program is solved;
   binding constraints are determined from a dual of said constraints and retained for a next iteration, or alternatively, all binding and non-binding constraints that have been added sequentially are retained across iterations.

2. The apparatus of claim 1, further comprising:
a graphical user interface (GUI) permitting user inputs and selectively permitting a display of results.

3. The apparatus of claim 1, wherein said stochastic linear programming problem, or stochastic mixed-integer linear programming problem, with conditional value at risk (CVaR) constraints comprises a portfolio optimization problem.

4. The apparatus of claim 3, wherein said portfolio comprises a financial portfolio.

5. A computerized method to determine an optimal solution to a stochastic linear programming problem, or stochastic mixed-integer linear programming problem, with conditional value at risk (CVaR) constraints, said method comprising:
   generating, using a processor on a computer, a sequence of solutions that converge to said optimal solution; and
   generating, using said processor, new constraints for a next iteration,
   wherein said optimal solution is determined using a sequence of steps as follows:
      a first solution x is provided as an initial estimate of said optimal solution;
      the CVaR value in each CVaR constraint is estimated by using a current solution x to estimate order statistics for each constraint;
      a linear program, or a mixed-integer linear program (if the problem is a stochastic mixed integer linear program) is constructed based on the estimated order statistics;
      said linear program or a mixed-integer linear program is solved;
      binding constraints are determined from a dual of said constraints and retained for a next iteration, or alternatively, all binding and non-binding constraints that have been added sequentially are retained across iterations.

6. The method of claim 5, further comprising:
permitting user inputs and selectively permitting a display of results, using a graphical user interface (GUI).

7. The method of claim 5, wherein said stochastic linear programming problem, or stochastic mixed-integer linear programming problem, with conditional value at risk (CVaR) constraints comprises a portfolio optimization problem.

8. The method of claim 7, wherein said portfolio comprises a financial portfolio.

9. The method of claim 5, as comprising a service to utilize said method to find optimal solutions for others.

10. The method of claim 9, said service comprising a portfolio management service.

11. A computer-readable storage medium tangibly embodying a program of machine-readable instructions executable by a digital processing apparatus to perform a method of claim 5.

12. The computer-readable storage medium of claim 11, as comprising one of:
   a standalone diskette of instructions to be inserted into a disk drive of a computer to download said machine-readable instructions onto said computer;
   a Read Only Memory (ROM) in said computer, as storing said machine-readable instructions in preparation for an execution of said method or in preparation to sending said machine-readable instructions to another computer on a network; and
   a Random Access Memory (RAM) in said computer, as storing said machine-readable instructions during an execution of said method on said computer.

13. An apparatus for optimizing portfolios, comprising:
a calculator, as executed by a processor on said apparatus, to determine an optimal solution to a portfolio expressed as a stochastic linear programming problem, or stochastic mixed-integer linear programming problem, with conditional value at risk (CVaR) constraints, said optimal solution being determined by generating a sequence of solutions that converge to said optimal solution,
wherein said optimal solution is determined using a sequence of steps as follows:
   a first solution x is provided as an initial estimate of said optimal solution;
   the CVaR value in each CVaR constraint is estimated by using a current solution x to estimate order statistics for each constraint;
   a linear program, or a mixed-integer linear program (if the problem is a stochastic mixed integer linear program) is constructed based on the estimated order statistics;
   said linear program or a mixed-integer linear program is solved;
   binding constraints are determined from a dual of said constraints and retained for a next iteration, or alternatively, all binding and non-binding constraints that have been added sequentially are retained across iterations.

14. The apparatus of claim 13, further comprising:
a graphical user interface (GUI) permitting user inputs and selectively permitting a display of results.

15. The apparatus of claim 14, wherein said portfolio comprises one of:
   a product/project portfolio;
   a financial portfolio; and
   a resource portfolio.

* * * * *